United States Patent
Matsuda

(10) Patent No.: US 7,660,608 B2
(45) Date of Patent: Feb. 9, 2010

(54) HANDSFREE DEVICE

(75) Inventor: Naoki Matsuda, Anjo (JP)

(73) Assignee: Denso Corporation, Kariya (JP)

( * ) Notice: Subject to any disclaimer, the term of this patent is extended or adjusted under 35 U.S.C. 154(b) by 610 days.

(21) Appl. No.: 11/488,827

(22) Filed: Jul. 18, 2006

(65) Prior Publication Data

US 2007/0072650 A1 Mar. 29, 2007

(30) Foreign Application Priority Data

Jul. 28, 2005 (JP) .............................. 2005-218760

(51) Int. Cl.
*H04M 1/00* (2006.01)
(52) U.S. Cl. ...................... 455/566; 455/569.1; 455/418
(58) Field of Classification Search ................. 455/566, 455/569.1–569.2, 563–565, 550.1, 556.2, 455/425, 414.1, 418–420; 379/420.01–420.04, 379/93.23, 93.18, 88.03
See application file for complete search history.

(56) References Cited

U.S. PATENT DOCUMENTS 5,764,731 A * 6/1998 Yablon .................... 379/88.15
5,940,189 A * 8/1999 Matsubara et al. .......... 358/440
6,167,287 A 12/2000 Chozui
2005/0111645 A1* 5/2005 Aoyama et al. ........ 379/142.06

FOREIGN PATENT DOCUMENTS

JP A-4-26888 1/1992
JP A-2003-298727 10/2003

* cited by examiner

*Primary Examiner*—Kamran Afshar
(74) *Attorney, Agent, or Firm*—Harness, Dickey & Pierce, PLC

(57) ABSTRACT

A handsfree device replaces a non-displayable character code in a registration name of each data entry in telephone number data with a space code in the course of reception from a mobile communication device. The registration name entirely replaced with the space code is stored in a memory medium as blank data. The registration name stored as the blank data is distinctively displayed on a display screen by using telephone number in association with the registration name in the telephone number data.

4 Claims, 4 Drawing Sheets

NAME: Asai Nagamasa (ASCⅡ)
TEL. NO.: 1234567890 (ASCⅡ)

NAME: (SPACE)
TEL. NO.: 1234567890 (ASCⅡ)

HANDSFREE DEVICE

CROSS REFERENCE TO RELATED APPLICATION

This application is based on and claims the benefit of priority of Japanese Patent Application No. 2005-218760 filed on Jul. 28, 2005, the disclosure of which is incorporated herein by reference.

FIELD OF THE INVENTION

The present invention generally relates to a handsfree device used in connection with a mobile communication device.

BACKGROUND OF THE INVENTION

In recent years, a handsfree device in, for example, a vehicle and a mobile communication device such as a cellular phone are connected by wireless connection or by wired connection for placing/receiving a call from the handsfree device and transferring telephone number data from the cellular phone to the handsfree device. Description in Japanese Patent Document JP-A-2003-298727 discloses the handsfree device that is capable of connecting to the cell phone by using the wireless connection for transferring the telephone number data.

A registration name in telephone number data coded by using ASCII code is appropriately displayed as an alphabetical character string on a display screen of handsfree device.

However, the registration name may be filled with a space character code for some reason. In this case, the registration name cannot be distinguished by the user because it is displayed as a blank space.

SUMMARY OF THE INVENTION

In view of the above-described and other problems, the present disclosure provides a handsfree device that distinctively displays an entry of telephone number data received from a mobile communication device after a registration name of the data entry being coded by non-displayable character code is totally replaced with a space character code.

The handsfree device in communication with a remote communication device by using one of wireless connection and wired connection for establishing a handsfree call between the remote communication device and another communication device has a first function for displaying a registration name being coded with character code including a space character code as telephone number data retrieved from a memory medium, and has a second function for displaying at least a part of telephone number in association with the registration name in the telephone number data for representing a blank registration name as the telephone number data retrieved from the memory medium. Further, the handsfree device includes the following four components. That is, the handsfree device includes a first determination unit for determining whether the registration name in the telephone number data includes a non-displayable character code when the telephone number data is received from the remote communication device, a first replace unit for replacing the non-displayable character code with the space character code when the first determination unit determines that the telephone number data includes the non-displayable character code, a second determination unit for determining whether the registration name in the telephone number data includes the space character code only, and a second replace unit for storing the registration name as the blank registration name in the memory medium when the second determination unit determines that the registration name includes the space character code only.

The handsfree device stores the registration name as blank data, i.e., a blank registration name, in the storage medium after replacement of the space character code with the blank data by the second replace unit when the registration name includes the space character code only. Therefore, the user recognizes respective entries of the telephone number data by at least partially displayed telephone number in association with the blank registration name when the registration name includes the noncompliant (non-displayable) character code having been replaced with the space character code by the first replace unit in the process of reception from the remote communication device.

In another aspect of the present disclosure, the handsfree device includes a determination unit for determining whether the registration name in the telephone number data retrieved from the storage medium includes the space character code only and a display unit for displaying at least a part of telephone number in association with the registration name in the telephone number data when the determination unit determines that the registration name includes the space character code only.

The handsfree device of the present disclosure displays at least a part of the telephone number by the display unit even when the data entry retrieved from the memory medium has the registration name of the space character only. Therefore, each entry of the telephone number data received from the mobile communication device can be distinctively displayed on the display unit by using the telephone number, thereby enabling the user to recognize each of the data entries in a suitable manner.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Figure 1:
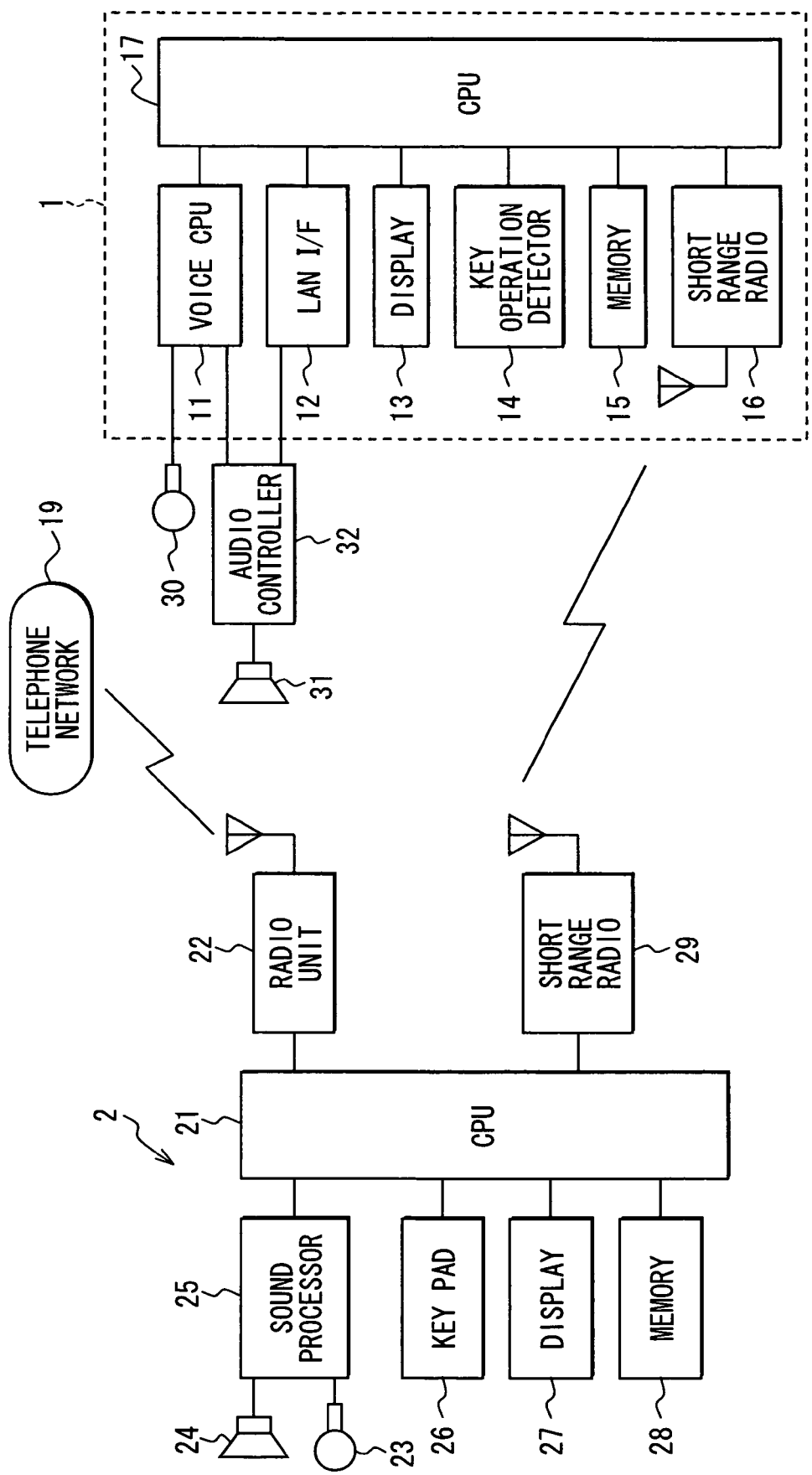
FIG. 1 shows a block diagram of a handsfree device and a cellular phone in a first embodiment of the present disclosure.

A handsfree device of the present disclosure is described with reference to the drawings. FIG. 1 shows a block diagram of the handsfree device and a mobile communication device (a cellular phone) in a first embodiment of the present disclosure. The handsfree device is realized as a part of a navigation system 1 in a vehicle, and a mobile communication device is realized as a cellular phone 2 in the present disclosure. The navigation system 1 has following components around a face of a user/driver and/or on a door of the vehicle. That is, a microphone 30 and a speaker 31 are used for inputting/outputting a voice signal controlled by an audio controller 32.

The navigation system 1 includes a CPU 17, a voice CPU 11 for controlling a voice input from the microphone 30 and a voice output from the speaker 31, a vehicle LAN interface 12 for connecting the CPU 17 through a vehicle LAN to the audio controller 32, a display 13 for displaying an image based on an image signal from the CPU 17, a key operation detector 14 for detecting an input from a touch switch disposed on the display 13 or a key pad around the display 13, a memory 15 having EEPROM, RAM or the like, and a short range radio 16 for establishing a short range connection to the cellular phone 2. The short range radio 16 establishes the short range connection between the navigation system 1 and the cellular phone 2 by using, for example, BLUETOOTH (Registered trademark) connection, an infrared connection or the like.

In addition, the navigation system 1 includes a position detector for detecting a position of the vehicle based on a signal from a GPS receiver, and a map data input device for inputting map data (both parts not shown in the figure).

The cellular phone 2 includes a CPU 21, a radio unit 22 for controlling communication with a telephone network 19, a sound processor 25 for controlling a voice input/output through a microphone 23 and a speaker 24, an off-hook/on-hook key, a key pad 26 having numeric keys of "0" to "9" and other keys, a display 27 for displaying a time, a date and the like, a memory 28 having a RAM, a ROM and the like, a short range radio 29 for establishing a short range connection to the navigation system 1.

The user of the cellular phone 2 operates the key pad 26 for inputting a registration name, a telephone number and the like as telephone directory data. The registration name may include a string of non-compatible character codes such as an illustration character having cellular phone type dependency or the like. As a result, the registration name stored in the memory 28 may include the non-compatible character codes.

The telephone directory data stored in the memory 28 of the cellular phone 2 can be transferred to the navigation system 1 by using the short range connection in the present embodiment.

The handsfree device in the present embodiment has a function that retrieves and displays the registration names retrieved from the telephone directory data in a memory medium according to a predetermined rule. The registration names in the memory medium are associated with the telephone numbers, and the display of the registration name on the handsfree device according to the predetermined rule displays the registration name and the telephone number or the telephone number only depending on the situation. That is, when the registration name includes a string of character codes including a space character code, the handsfree device prioritizes the display of the registration name over the display of the telephone number associated thereto, and when the registration name is "Blank," the handsfree device displays the telephone number. In this case, a blank registration name includes no character code in the string.

The CPU 17 of the navigation system 1 operates by having provision of electricity from a battery (not shown in the figure) in the vehicle. The navigation system 1 displays on the display 13 a navigation screen such as a map screen for displaying a nearby area map with a vehicle position mark upon receiving input from the user.

The display 13 of the navigation system 1 displays a telephone directory data reception standby screen when the user operation for a standby instruction for receiving the telephone directory data reception is detected by the key operation detector 14.

Figure 2:
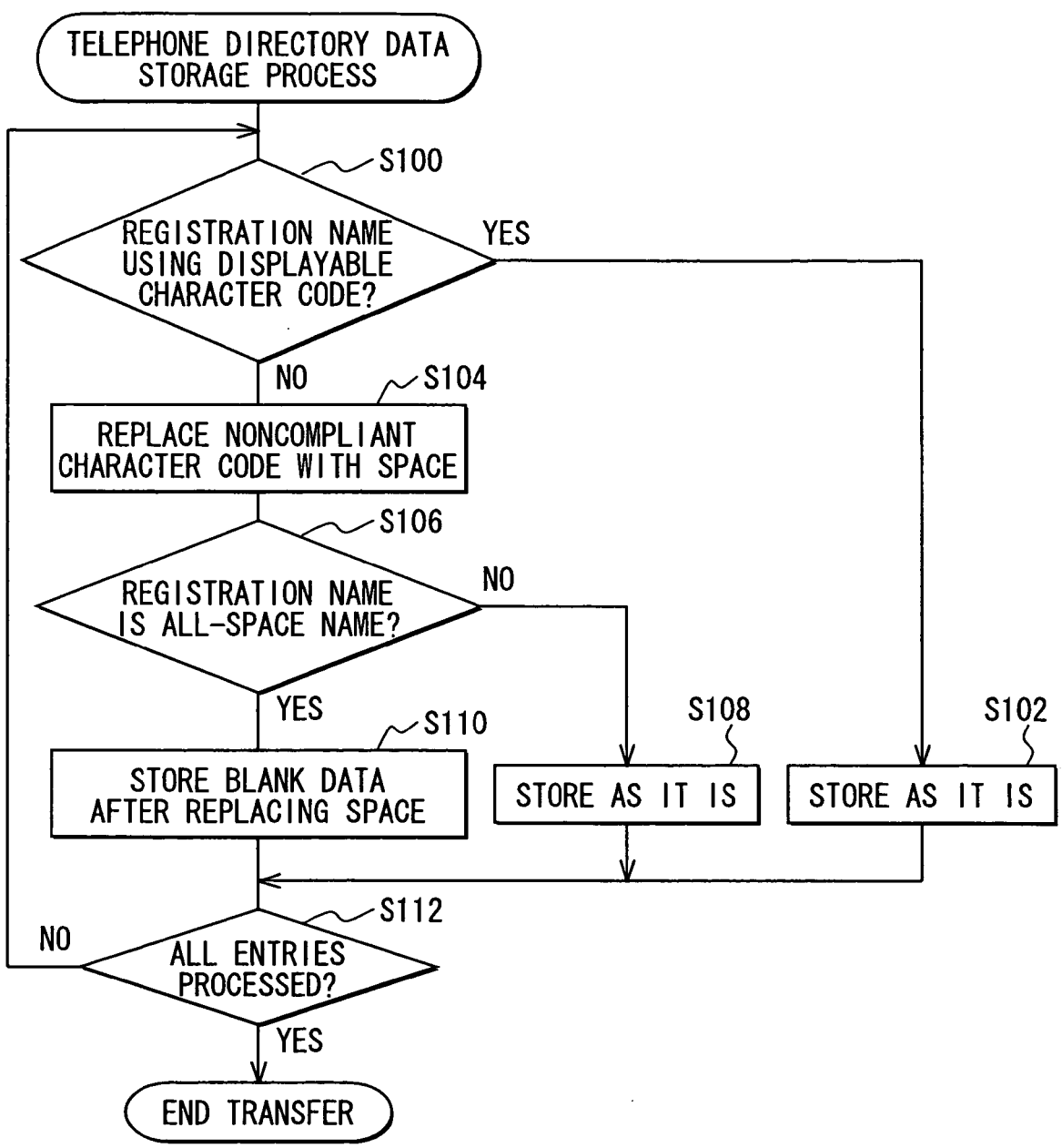
FIG. 2 shows a flowchart of a process for storing telephone number data in a CPU of a navigation system.

Then, the CPU 17 receives the telephone directory data from the cellular phone 2 by using the short range radio 16 upon detecting a user input for starting reception of the telephone directory data, and stores the received data temporarily in an internal memory. The CPU 17 starts a telephone directory data storage process shown in FIG. 2 at the same time as it receives and stores the received data. The CPU 17 processes one entry of the telephone directory data at a time in the telephone directory data storage process by retrieving the stored data from the internal memory.

The storage process in the CPU 17 starts with step S100.

In step S100, the process determines whether the registration name uses displayable character codes. More practically, the process retrieves a first entry of the telephone directory data, and determines whether the registration name of the first entry is a string of the displayable character codes by examining the existence of an noncompliant character code in the registration name. In this case, the noncompliant character code includes an illustration character code having hardware specific dependency or the like that cannot be displayed on the navigation system 1.

The process proceeds to step S102 when the character codes are displayable (step S100:YES), and stores the registration name and the telephone number as they are in the memory 15. After storing the name and the number, the process proceeds to step S112.

The process proceeds step S104 when the character codes in the registration name are not displayable (noncompliant) (step S100:NO), and replaces the noncompliant character codes in the registration name with the space character codes. The registration name string is partially replaced with the space codes when a part of the registration name includes the noncompliant character codes, and the registration name string is totally replaced with the space codes when the registration name is entirely coded by the noncompliant character codes. The process proceeds step S106 after replacing the noncompliant character codes with the space.

In step S106, the process determines whether the registration name string is totally replaced with the space. The process proceeds step S108 when the registration name string includes character codes other than the space character (step S106:NO). In step S108, the process stores the name and the number as they are in the memory 15. Then, the process proceeds to step S112.

The process proceeds step S110 when the registration name string includes the noncompliant character codes only (step S106:YES). More practically, the process replaces spaces in the registration name with blank data, and stores the blanked registration name in the memory 15 in association with the telephone number and other data. Then, the process proceeds to step S112. The blanked registration name becomes void in terms of inclusion of the character code.

In step S112, the process determines whether all entries in the telephone directory data are processed. More practically, the process compares the number of the processed entries of the telephone directory data in the memory 15 and the number of the entries of the telephone directory data stored in the internal memory is same. The process returns to step S100 for further processing un-processed data when the number of the processed entries is smaller than the number of the entries in the internal memory (step S112:NO). The process concludes itself and displays the end of telephone directory data transfer on the display 13 when the number of the processed entries matches the number of the data in the internal memory (step S112:YES).

Figure 5A:
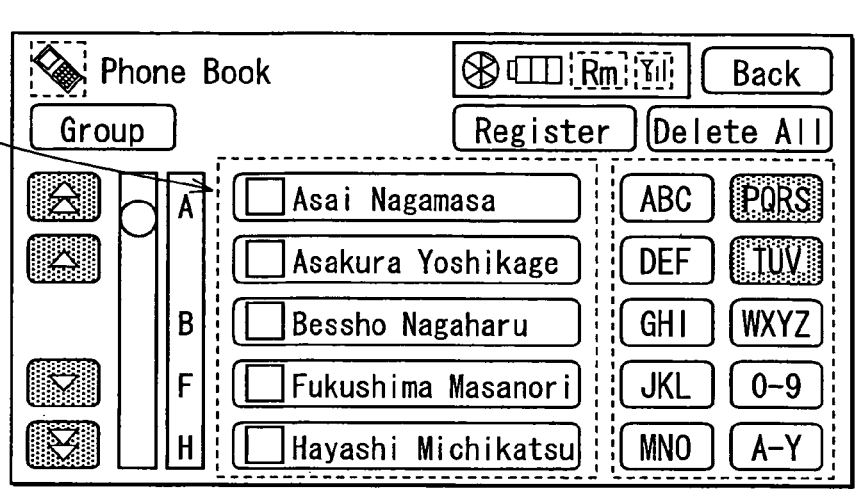
FIGS. 5A and 5B show different illustrations of the display screen for displaying the telephone number data in the handsfree device.

The display of the entry of the telephone directory data is conducted in the following manner. The CPU 17 retrieves the entries of the directory data in alphabetical order from the memory 15 when the user provides the directory data display instruction for the navigation system 1 by using a menu screen on the system 1, and displays a telephone directory display screen on the display 13 as shown in FIG. 5A. More practically, the entries in the directory data are displayed in the display screen in a list of an alphabetical order (A-Z), an ascending/descending order of numbers (0-9), or a symbol group order (SY), and the list of the entries in the display screen scrolls up/down when the user provides scroll instructions. The registration name having an initial character of "+ (plus)", "– (minus)" or other symbol is displayed in the display screen as it is.

Figure 4:
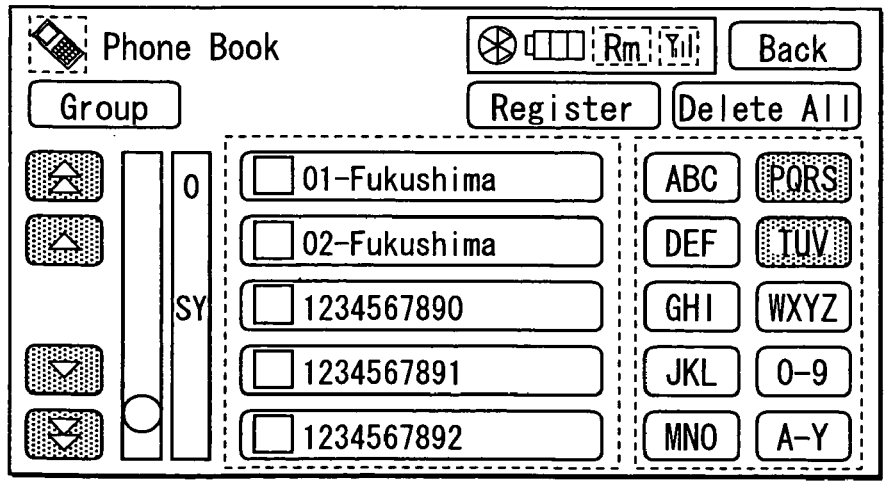
FIG. 4 shows an illustration of a display screen for displaying the telephone number data in the handsfree device.

The registration name being blanked in the storage process is displayed by using the telephone number. FIG. 4 shows an example of the registration name display screen having the blanked registration names. The space of the registration names being blanked in the storage process are filled with the telephone numbers, that is, the telephone numbers of 1234567890, 1234567891, and 1234567892. The registration name stored as blank is treated to have an initial character of symbol in the telephone directory data.

Figure 5B:
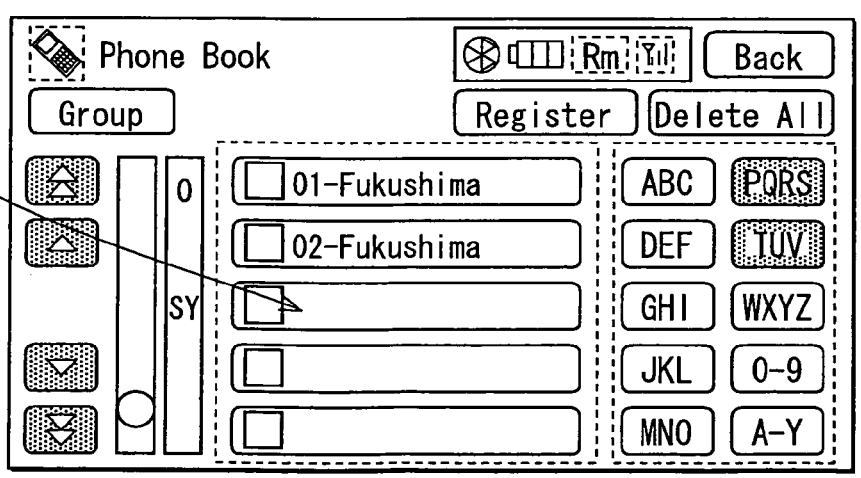

FIG. 5B shows an illustration of the registration name display screen having the entries of all space registration name. The comparison of the display screen shown in FIG. 4 to the display screen in FIG. 5B clarifies that the user of the handsfree device in the present embodiment can distinguish each entry of the telephone directory data by the telephone number appeared on the display screen.

The handsfree device of the present embodiment displays the telephone number itself when the registration name of the telephone number retrieved from the memory 15 is blank data, and displays the registration name when at least a part of the registration name is coded by the character code of displayable characters including the space. The registration name transferred from the cellular phone 2 to the navigation system 1 is processed according to a predetermined rule for replacing the noncompliant character in the registration name with the space character, and is stored in the memory 15 as blank data when the registration name is entirely replaced with the space characters. In this manner, the handsfree device provides for the user a distinctive display of each entry of the telephone directory data by using the telephone number associated to the registration name even when the registration name is stored as blank data in the storage process after the telephone directory data is transferred from the cellular phone 2 to the navigation system 1.

Second Embodiment

A second embodiment of the present disclosure is described with reference to the drawings. The handsfree device and the cellular phone 2 in the second embodiment have the same structure as the first embodiment. In the second embodiment, the registration name of the telephone directory data is stored as it is in the memory 15 in the transfer process from the cellular phone 2 to the navigation system 1 even when the registration name is entirely replaced with the space character. The registration name entirely replaced with the space character is displayed on the display screen with the space character being treated as blank data after retrieval from the memory 15. That is, the telephone number associated with the all-space registration name fills in the blank of the registration name on the display screen.

The CPU 17 in the navigation system 1 stores the telephone directory data temporarily in the internal memory when it receives the data from the cellular phone 2. Then, the CPU determines whether the registration name includes the noncompliant character code. The registration name that does not include the noncompliant character code is stored in the memory 15 as it is, and the registration name that includes the noncompliant character code is stored in the memory 15 after replacing the noncompliant character code with the space character code.

The CPU 17 retrieves the telephone directory data from the memory 15 when the user provides telephone directory display instruction for the navigation system 1. Then, the CPU 17 displays the retrieved data in the display screen on the display 13 as the list of the alphabetical order, the ascending/descending order or in the symbol group order of the entries. The list of the entries in the display screen scrolls up/down when the user provides scroll instructions.

Figure 3:
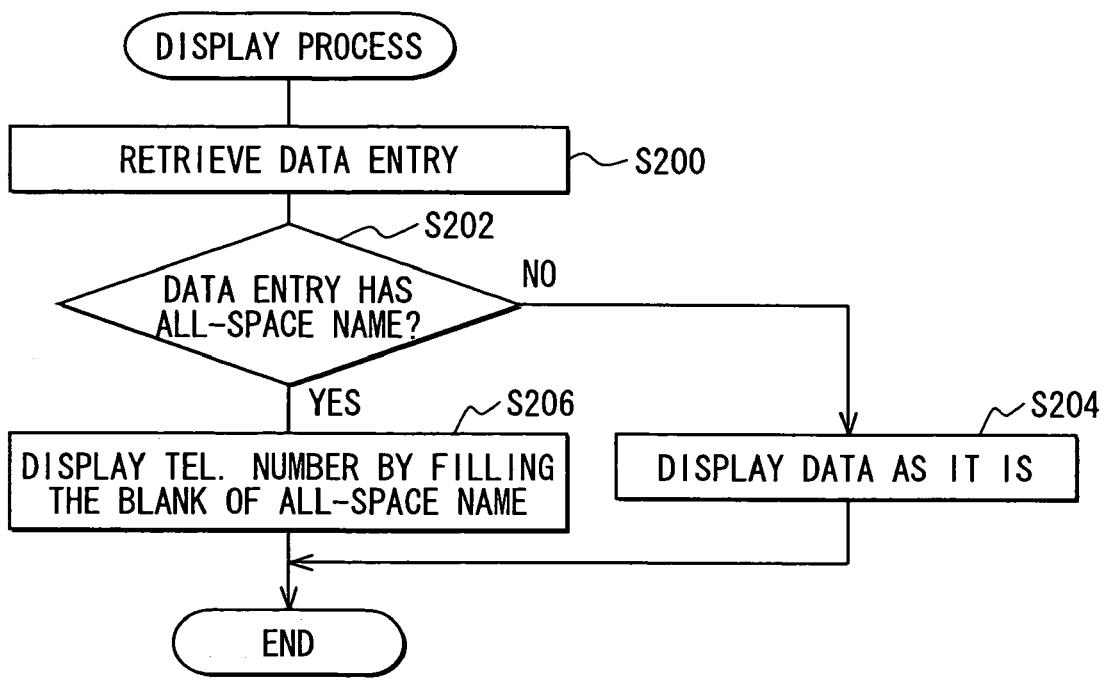
FIG. 3 shows a flowchart of a process for displaying telephone number data in a CPU of the navigation system.

The CPU 17 executes a process for displaying the telephone directory data that includes the entries of registration name entirely replaced with the space character. The display process executed by the CPU 17 is shown as a flowchart in FIG. 3.

In step S200, the process retrieves the telephone directory data entries from the memory 15 upon detecting the user operation of scrolling the list of entries in the display screen. The process proceeds step S202 after data retrieval.

In step S202, The process determines whether each entry has an "all-space" name as the registration name. The process proceeds step S204 to display the registration name as it is when the registration name includes the character code other than the space character (step S204:NO). The process proceeds step S206 when the registration name is the "all-space name" (step S204:YES). Then, the process displays on the display screen the telephone number in association with the all-space registration name by filling the blank of the registration name with the telephone number. The process concludes itself after displaying the registration name in either of the two manner described above.

The handsfree device retrieves the telephone directory data from the memory 15, determines whether the data entry has the all-space name, and displays the telephone number in place of the all-space registration name when the data entry has the all-space registration name. In this manner, the handsfree device provides for the user a distinctive display of each entry of the telephone directory data by using the telephone number associated to the registration name of each entry even when the registration name is stored as the all-space name in the storage process after data transfer from the cellular phone 2 to the navigation system 1.

Although the present invention has been fully described in connection with the preferred embodiments thereof with reference to the accompanying drawings, it is to be noted that various changes and modifications will become apparent to those skilled in the art.

For example, the connection between the navigation system 1 and the cellular phone 2 may use a wired connection instead of a wireless connection.

The cellular phone 2 may be replaced with a PDA or other type of communication terminal.

The telephone number in the display screen may be representatively displayed by using last four digit of the number instead of being displayed in full length. The upper digit of the telephone number may be replaced with an asterisk mark (*) or the like for the ease of recognition by the user. In addition, the replacement of the telephone number with the symbol such as an asterisk may be performed depending on the speed of the vehicle. That is, the telephone number may be fully displayed on the display screen when the vehicle is traveling at a speed that is equal to or under a predetermined value, and a part of the telephone number may be replaced with the symbol when the vehicle is traveling above the predetermined speed.

The telephone number in the display screen may abide by a limitation of display space in the display screen. That is, the telephone number may be partially displayed on the display screen when the space for the telephone number display is limited.

Further, the telephone number may include a delimiter or the like in the string. That is, for example, the telephone number 1234567890 may include a delimiter P in such a manner 123456789P0 or the like. In such a case, the telephone number may be partially displayed due to the limitation of the display frame.

Such changes and modifications are to be understood as being within the scope of the present invention as defined by the appended claims.

What is claimed is:

1. A handsfree device in communication with a remote communication device by using one of wireless connection and wired connection for establishing a handsfree call between the remote communication device and another communication device, the handsfree device having a first function for displaying a registration name being coded with character code including a space character code as telephone number data retrieved from a memory medium, the handsfree device having a second function for displaying at least a part of a telephone number in association with the registration name in the telephone number data for representing a blank registration name as the telephone number data retrieved from the memory medium, the handsfree device comprising:
 a first determination unit for determining whether the registration name in the telephone number data includes a non-displayable character code when the telephone number data is received from the remote communication device;
 a first replace unit for replacing the non-displayable character code with the space character code when the first determination unit determines that the telephone number data includes the non-displayable character code;
 a second determination unit for determining whether the registration name in the telephone number data includes the space character code only; and
 a second replace unit for storing the registration name as the blank registration name in the memory medium when the second determination unit determines that the registration name includes the space character code only.

2. A handsfree device in communication with a remote communication device by using one of, wireless connection and wired connection for establishing a handsfree call between the remote communication device and another communication device, the handsfree device having a function for storing in a storage medium a registration name in telephone number data as a string of space character codes of equivalent length of the registration name upon detecting that the registration name in the telephone number data received from the remote communication device includes a non-displayable character code, the handsfree device comprising:
 a determination unit for determining whether the registration name in the telephone number data retrieved from the storage medium includes the space character code only; and
 a display unit for displaying at least a part of a telephone number in association with the registration name in the telephone number data when the determination unit determines that the registration name includes the space character code only.

3. The handsfree device according to claim 2, wherein the telephone number data received from the remote communication device includes entries respectively having a telephone number and the registration name.

4. The handsfree device according to claim 2, further comprising a replacement unit for replacing character codes in the registration name with the space character code when the telephone number data includes the non-displayable character code.

* * * * *